United States Patent

[11] 3,603,859

| [72] | Inventor | Robert J. McGee<br>Laurel, Md. |
|---|---|---|
| [21] | Appl. No. | 823,425 |
| [22] | Filed | May 9, 1969 |
| [45] | Patented | Sept. 7, 1971 |
| [73] | Assignee | The United States of America as represented by the Secretary of the Air Force |

[54] SYSTEM FOR MULTICHANNEL VARIABLE-TIME CONSTANT CONTROL
2 Claims, 4 Drawing Figs.

[52] U.S. Cl. .................................................. 320/1, 307/246, 307/251
[51] Int. Cl. .................................................... H02m 3/06, H03k 17/00
[50] Field of Search .......................................... 320/1; 307/240, 246, 251

[56] References Cited

UNITED STATES PATENTS

| 2,999,208 | 9/1961 | Ruehlemann .................. | 320/1 X |
| 3,085,165 | 4/1963 | Schaffert ....................... | 307/301 X |
| 3,482,113 | 12/1969 | Heesh ............................ | 307/240 X |

Primary Examiner—Terrell W. Fears
Assistant Examiner—Stuart Hecker
Attorneys—Harry A. Herbert, Jr. and George Fine ABSTRACT: A system for simultaneously varying the time constant of a plurality of RC networks over a continuous range of values with the time constant of all the RC networks over the full continuous range being the same. In the system each RC network receives its charging current through an FET (Field Effect Transistor) switch. The gates of all the FET switches are connected to a common bus which is driven by a variable monostable multivibrator. By proper selection of the multivibrator trigger frequency and multivibrator output, the RC time constant of each of the networks is simultaneously controlled.

INVENTOR.
ROGER J. McGEE
BY Harry A. Herbert Jr
George Ying
ATTORNEYS

SYSTEM FOR MULTICHANNEL VARIABLE-TIME CONSTANT CONTROL

BACKGROUND OF THE INVENTION

The present invention relates to varying the time constant of a multiplicity of RC networks and more particularly a system for simultaneously varying the time constant of a multiplicity of RC networks over a continuous range of values and in addition thereto the time constant of all the networks over the full continuous range will have the same RC time constant.

In the past, varying the time constant of a multiplicity of RC networks was accomplished by changing the magnitude of the resistance or capacitance in the RC networks. Mechanically coupled potentiometers or variable capacitors were most commonly used. When the number of networks which must be simultaneously varied is very large (in the hundreds), the problem of mechanical coupling becomes impractical.

An alternate method to perform this function would be to vary the resistance of the RC network with an active device, such as a field-effect transistor, whose resistance varies as a function of an input voltage or current. This approach is feasible for a few RC networks. When more than a few RC networks must be varied, this method is impractical.

The method of this invention was used in a spectrum processor for a Doppler Radar system. The spectrum processor quantized the Doppler frequency spectrum, performed automatic detections of signals and maintained a constant false alarm rate (CFAR) throughout the detection process. The CFAR requirement was mechanized by establishing a weighted reference for each frequency-detection channel. The weighted reference was obtained by averaging (integrating) the output of the range channels on a per filter basis. The weighted reference serves as a reference for a threshold detector. The detected envelope of the radar signal is compared with the weighted reference on a per filter basis. If the detected waveform is greater in amplitude than the weighted reference a detection is said to occur.

The weighted reference was obtained by connecting the detected waveform of each channel to a low pass RC filter. The output of the RC filter network is the weighted sum (or integral) of the past values of detected waveforms. Less weight is given to values of detected waveforms in the more distant past. The weights given to past values of detected waveforms follow the exponential function $e^{-\infty t}$, where $\infty=1/RC$. Therefore, the weights (or effectiveness) of past values in establishing the reference for each channel is controlled by the $RC$ time constant of the low pass network in each channel. One of the primary functions of this radar signal processor was the capability of being able to simultaneously vary the time constant of each channel over a continuous range of values.

The method described in this invention permits the RC time constant of each channel of a multichannel processor to be continuously and simultaneously varied. Moreover, for any value of time constant required, each channel will have the same time constant within the initial tolerance of the components used.

SUMMARY OF THE INVENTION

A system for simultaneously varying the effective time constant of a plurality of RC charging networks over a continuous range of values with the RC time constant of all the networks over the full continuous range having the same RC time constant. In this system, each RC charging network receives its charging current through an FET switch. The gates of all the FET switches are connected to a common bus. The common bus is driven by a variable monostable multivibrator. By proper selection of the multivibrator trigger frequency and the multivibrator output frequency, the RC time constant of each of the charging RC networks can be precisely, simultaneously controlled.

An object of the invention is to provide a system for simultaneously varying the time constant of a multiplicity of RC networks over a continuous range of values.

Another object of the present invention is to provide a system for simultaneously varying the time constant of a multiplicity of RC networks over a continuous range of values while retaining the time constant of each of the RC networks identical over the range of values.

The various features of novelty which characterize this invention are pointed out with particularity in the claims annexed to and forming part of this specification. For a better understanding of the invention, however, its advantages and specific objects obtained with its use, reference should be had to the accompanying drawings and descriptive matter in which is illustrated and described the preferred embodiment of the invention.

DESCRIPTION OF THE PREFERRED EMBODIMENT

Figure 1:
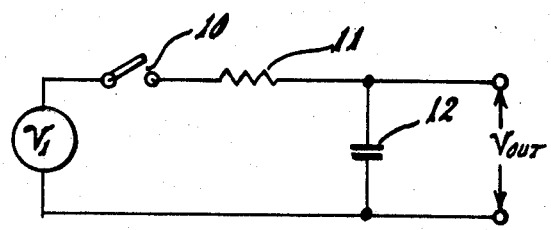
FIG. 1 is a schematic drawing illustrating the principle of the invention.
Figure 2:
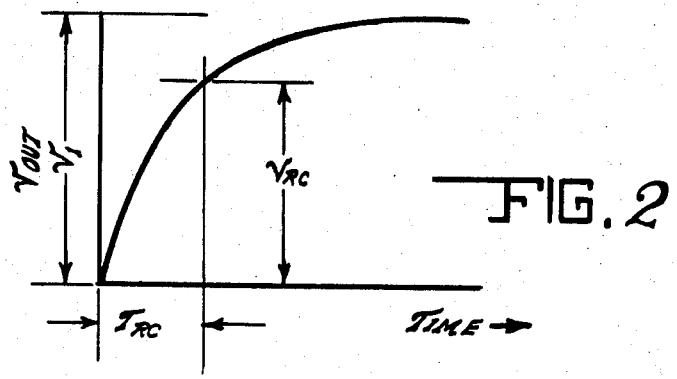
FIG. 2 illustrates the output waveform of the circuit of FIG. 1 when the switch is closed.

The general principle of the invention is illustrated in FIG. 1. When switch 10 is closed and capacitor 12 initially discharged, a step of voltage of magnitude $V_1$ is impressed on the RC network of resistor 11 and capacitor 12 and the output voltage across capacitor 12 will begin to rise according to $V_{out}=V_1(1-e_1{}^t/RC)$ as shown in the waveform of FIG. 2 with $T_{RC}$ being equal to the natural time constant of the RC network, that is, $T_{RC}=RC$. (Define the output voltage $V_{out}$ at time $T_{RC}$ as $V_{RC}$).

Figure 3:
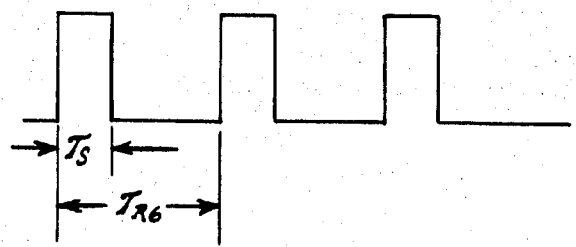
FIG. 3 illustrates the output waveform of the circuit of FIG. 1 when the switch is repetitively opened and closed.

If, instead, switch 10 is now repetitively opened and closed at a rate equal to $1/T_{RG}$ as shown in the waveform of FIG. 3, where switch 10 is closed during time $T_S$, the output voltage will now rise more slowly and, at a new time (Teff), it will be equal to $V_{RC}$. This will occur when the sum of the areas determined by the pulses of width Ts is equal to $(V_1)(T_{RC})$. The number of pulses ($N$) required to obtain this area is:

$$N=T_{RC}/T_S$$

and the time (Teff) required to get N pulses is $$Teff=N\,T_{RG}$$

Therefore, the time required for Vout to obtain the magnitude of $V_{RC}$ is:

$$Teff=NT_{RG}=(T_{RG}/T_S)\,T_{RC}$$

Since $T_{RC}$ was defined as the network-component time constant, we have $$Teff=(T_{RG}/T_S)\,RC$$

The time constant of the RC network has been effectively increased by the factor $T_{RG}/T_S$. By controlling the time Ts, the effective time constant of the circuit may be varied.

Figure 4:
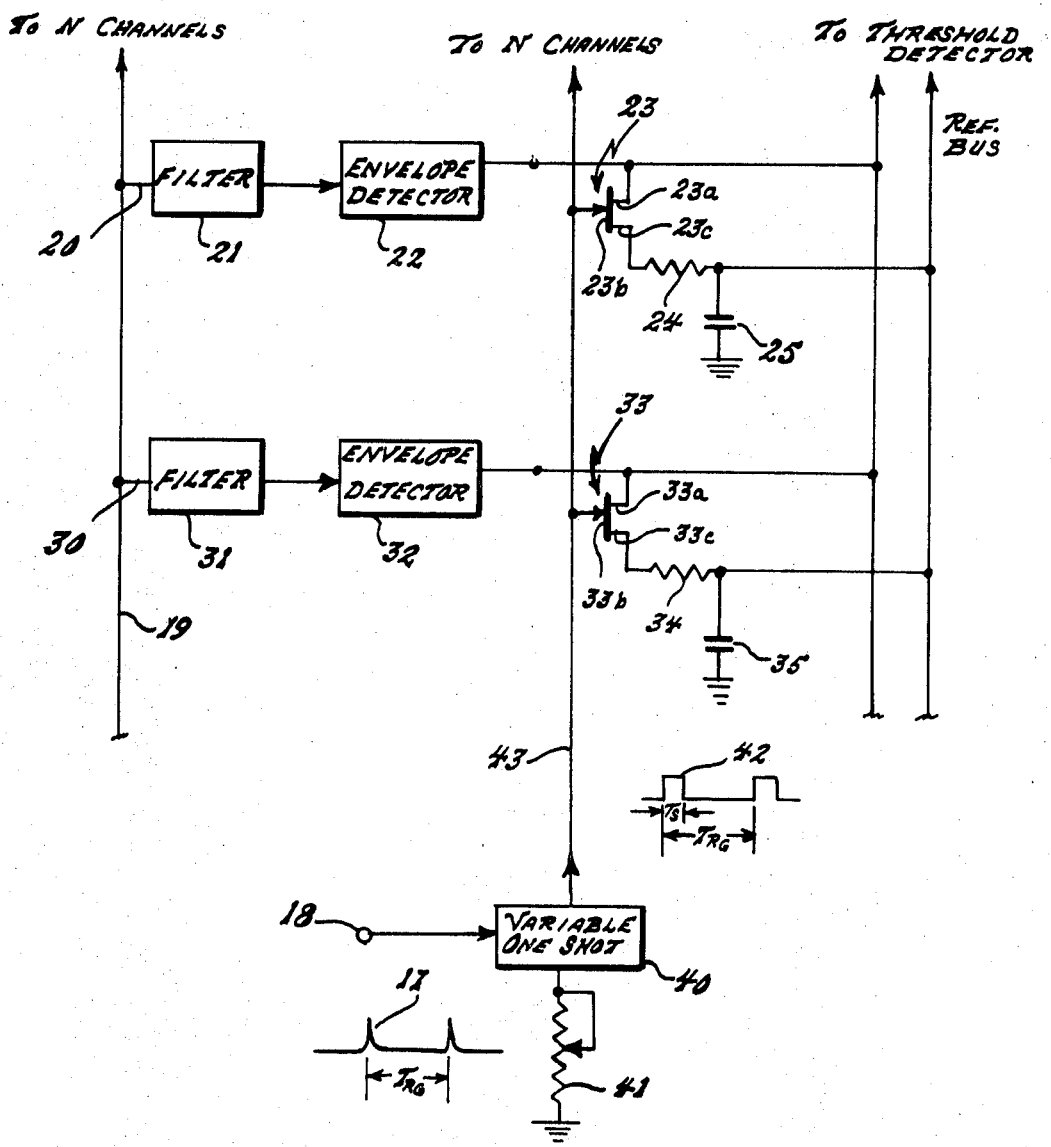
FIG. 4 shows partly in block and partly in schematic form the system of the present invention.

Now referring in detail to FIG. 4 showing the preferred embodiment of this invention, there are shown two channels 20 and 30 of N detection channels of a Doppler radar signal processor, which performs the functions of band-pass filtering, envelope detection, and automatic target detection, while maintaining constant false alarm rate.

The input signal to be processed is received on common input line 19 and is fed simultaneously to band-pass filters 21 and 31. The output signals from filters 21 and 31 are passed through envelope detectors 22 and 32 and then fed to electrodes 23a and 33a of FET switches 23 and 33 to be impressed on their associated RC network of resistor 24, capacitor 25 and resistor 34, capacitor 35, by way of electrodes 23c and 33b, respectively. Thus, the detected waveform of each filter position is impressed on its associated RC network through an FET switch. The FET gates of all switches are connected to common bus 43 by way of electrodes 23b and 33b. Common bus 43 is driven by variable monostable multivibrator 40 which is triggered by pulse 17 received at input 18. Pulse 17 may be derived from the associated radar and has a repetition rate equal to a range gate time. Variable monostable multivibrator 40 is controlled by potentiometer 41. Potentiometer 41 may be referred to as the time-constant control. The output of multivibrator 40 is shown as pulse 42. The outputs from FET switches 23 and 33 are fed to the aforementioned threshold detector and reference bus. The operation is identical to the general case illustrated in FIg. 1. All FET switches are turned on simultaneously by the monostable multivibrator 40 for a time equal to the pulse width of the monostable. The effective time constant (hence, the averaging time or the number of range gates which are effective in establishing the reference of each channel) is $T_{RG}/T_s RC$. It should be noted that no tracking problems or factory-tracking adjustments exist for this system, since the only first order differences between channels is the initial tolerance of the Resistance and Capacitors. These can easily be obtained to the required accuracy between channel time constants. By varying the time of the one-shot pulse width, the effective time constant of all channels may be simultaneously controlled.

Another application of the method of this invention which may be useful would be to reduce the size of a capacitor by the multiplying factor $T_{RG}/Ts$. This may allow a circuit to be reproduced in a monolithic version by using a smaller value of capacitance.

In summary, the method of this disclosure utilizes a novel circuit arrangement to vary the time constant of a large number of RC filters for a radar processor. The advantages of this method are: freedom from difficult mechanical problems; no factory adjustments on a per channel basis; simplicity on a per channel basis; low cost; and, smaller packaging.

What is claimed is:

1. A system for simultaneously varying the time constant of a plurality of resistor-, capacitor-charging networks over a continuous range of values with the time constant of the networks over the full continuous range being the same comprising a plurality of resistor-, capacitor-charging networks, each of said networks having an input and output, the capacitors in each of said networks are selected to be identical to each other in magnitude and the resistors in each of said networks are also selected to be identical in value to each other, switching means for each of said plurality of networks, each of said switching means being comprised of a field-effect transistor having an output connected to the input of its associated network, a first input receiving a charging signal, a second input receiving a pulse for gating said switching means on during the period of said pulse, said gating pulse being common to all of said switching means and having a predetermined frequency and width to control the time constant of each of said networks, and means common to all of said field-effect transistors to generate said pulse for gating, said means for generating said gating pulse is comprised of a monostable multivibrator, said monostable multivibrator receiving an activating pulse of predetermined pulse repetition frequency, each activating pulse operating to provide an output pulse of predetermined width.

2. A system as defined in claim 1, further including means for varying the width of said output pulse in accordance with a desired time constant.